United States Patent
Jang et al.

(10) Patent No.: US 9,054,570 B2
(45) Date of Patent: Jun. 9, 2015

(54) STATOR ASSEMBLY FOR MOTOR HAVING HALL SENSOR PART FIXED TO END OF TOOTH OF STATOR

(75) Inventors: Jeong Cheol Jang, Gwangju (KR); Ji Min Lee, Gwangju (KR)

(73) Assignee: NEW MOTECH CO., LTD., Gwangju (KR)

(*) Notice: Subject to any disclaimer, the term of this patent is extended or adjusted under 35 U.S.C. 154(b) by 291 days.

(21) Appl. No.: 13/463,962

(22) Filed: May 4, 2012

(65) Prior Publication Data

US 2013/0009513 A1     Jan. 10, 2013

(30) Foreign Application Priority Data

Jul. 7, 2011    (KR) .................. 10-2011-0067178

(51) Int. Cl.
| | |
|---|---|
| H02K 3/32 | (2006.01) |
| H02K 3/52 | (2006.01) |
| H02K 3/34 | (2006.01) |
| H02K 11/00 | (2006.01) |

(52) U.S. Cl.
CPC ........... *H02K 3/522* (2013.01); *Y10T 29/49009* (2015.01); *H02K 11/0021* (2013.01); *H02K 3/32* (2013.01); *H02K 2203/12* (2013.01)

(58) Field of Classification Search
CPC ........... H02K 3/32; H02K 3/325; H02K 3/34; H02K 3/345; H02K 29/08; H02K 11/0021
USPC ........................................ 310/45, 43, 68 B
See application file for complete search history.

(56) References Cited

U.S. PATENT DOCUMENTS

| | | | |
|---|---|---|---|
| 4,847,527 A | * | 7/1989 | Dohogne .................... 310/68 B |
| 2004/0021375 A1 | * | 2/2004 | Mayumi ........................ 310/45 |
| 2005/0067914 A1 | * | 3/2005 | Baba et al. .................... 310/216 |
| 2006/1009173 | | 5/2006 | Hilton et al. |
| 2008/0122300 A1 | * | 5/2008 | Cho et al. ....................... 310/43 |
| 2011/0037331 A1 | * | 2/2011 | Jang et al. ...................... 310/71 |

FOREIGN PATENT DOCUMENTS

| | | | | | |
|---|---|---|---|---|---|
| JP | 2005-110364 A | | 4/2005 | | |
| JP | 2005-130540 A | | 5/2005 | | |
| JP | 2006-141173 A | | 6/2006 | | |
| JP | 2009089588 A | * | 4/2009 | ............ | H02K 11/00 |
| KR | 10-2005-0105863 A | | 11/2005 | | |
| KR | 20-0406417 Y | | 1/2006 | | |
| KR | 20-0408923 | | 2/2006 | | |
| KR | 10-2006-0078845 A | | 7/2006 | | |
| KR | 10-2009-0065936 A | | 6/2009 | | |
| KR | 10-0934661 B | | 6/2009 | | |

OTHER PUBLICATIONS

Machine translation of JP2009089588A (Apr. 2009).*

* cited by examiner

*Primary Examiner* — Michael Andrews
(74) *Attorney, Agent, or Firm* — Sherr & Jiang, PLLC

(57) ABSTRACT

Disclosed therein is a stator assembly including: a stator core (10) having a round base, a plurality of teeth radially formed along the outer circumferential surface of the base, and at least one connector bushing formed on the inner circumferential surface of the base; and an insulation coating layer (20) formed on the surface of the stator core, wherein the insulation coating layer (20) is coated to the outer diameter surfaces of the teeth of the stator core.

2 Claims, 6 Drawing Sheets

STATOR ASSEMBLY FOR MOTOR HAVING HALL SENSOR PART FIXED TO END OF TOOTH OF STATOR

CROSS REFERENCE TO PRIOR APPLICATIONS

The present application claims priority under 35 U.S.C. §119 to Korean Patent Application No. 10-2011-0067178 (filed on Jul. 7, 2011), which is hereby incorporated by reference in its entirety.

BACKGROUND OF THE INVENTION

1. Field of the Invention

The present invention relates to a motor. More particularly, the present invention relates to a stator assembly of a new structure applied to the motor.

2. Background Art

In general, a motor that a rotor of the motor is located outside a stator is called an outer-rotor type motor, and a motor that the rotor is located inside the stator is called an inner-rotor type motor. The present invention relates to a stator assembly of an outer-rotor type DD (Direct Driving) motor used in washing machines or of the inner-rotor type motor mainly used in air conditioners.

FIG. 1 is an exploded perspective view of a stator assembly according to a prior art, and FIG. 2 is a perspective view showing a state where a hall sensor and a power lead part are joined to a stator core assembly according to the prior art.

Referring to FIG. 1, the stator core assembly according to the prior art has a structure that insulators 150 are joined to the top and the bottom of the stator core 10. The stator core includes a round base 15, teeth 11 radially formed on the circumference of the base 15, and slots 12 formed between the adjacent teeth. Each of the insulators 150 includes connector bushings 151 formed on the inner face of the insulator 150, teeth insulating portions 152 surrounding the teeth and adapted for winding a coil thereon, and recesses to which end portions of the teeth are respectively joined. FIG. 1 illustrates the outer-rotor type stator core assembly, but an inner-rotor type stator core assembly also includes teeth facing toward the center of the base and is similar to the outer-rotor type stator assembly excepting that it does not have the connector bushings.

Referring to FIG. 2, a power lead part 170 for electrically connecting a hall sensor part 160 with a power Supply to sense a magnetic flux is joined to the insulator of the stator assembly. That is, the hall sensor part 160 is joined to the insulator 150.

As described above, in the stator assembly according to the prior art, teeth insulating parts 152 of the insulator are respectively joined to the teeth 11 of the stator core, and the coil is wound on the teeth insulating parts 152. The teeth insulating parts 152 are thicker than the teeth because the teeth insulating parts 152 are made of a resin molding material injection-molded integrally with the insulator 150, and hence, slots 154 of the insulator 150 are smaller than the slots 12 of the stator core. Accordingly, it influences on physical characteristics, such as a change in magnetic flux, which can be obtained through windings of the same number. Moreover, there is another problem in that an amount of resin moldings to be injected is increased. Furthermore, as shown in FIG. 2, there are several problems in that a mold becomes complicated and manufacturing costs rise because the amount of resin moldings to be injected is increased in the case that the connector bushings 151 and a hall sensor connecting part 155 are selectively formed on the insulator 150. Additionally, because the hall sensor connecting part 155 is formed just at one portion of the insulator, a joining position of the hall sensor part is restricted to the one portion.

In the meantime, Korean Utility Model Registration No. 20-0408923 discloses a technology to insulate the surface of a stator by powder coating. However, the powder coating layer is not formed on the outer diameter surfaces of the teeth radially formed on the stator. In this instance, because the outer diameter surfaces of the teeth are formed by thin steel sheets stacked thereon, it may cause a problem in insulating performance due to the uneven surface, and hence, it cannot solve problems of withstand voltage and withstand current.

So, in order to solve the above problems, the inventor of the present invention proposes a stator assembly of a new structure.

SUMMARY OF THE INVENTION

Accordingly, the present invention has been made to solve the above-mentioned problems occurring in the prior arts, and it is an object of the present invention to provide a stator assembly, which can keep evenness of outer diameter surfaces of teeth by evenly insulation-coating to the outer diameter surfaces of the teeth when the stator core is insulation-coated so as to enhance an insulating performance.

It is another object of the present invention to provide a stator assembly, which can insulate the teeth without reducing a space, for slots by insulation-coating the stator core and selectively inserting insulation films into the slots of the stator core.

It is a further object of the present invention to provide a stator assembly, which can remarkably reduce an amount of resin moldings required by changing the structure of an insulator of the stator core.

It is a still further object of the present invention to provide a stator assembly, which can freely decide a position of a hall sensor part.

The above and other objects will be easily achieved by the present invention described below.

To accomplish the above object, according to the present invention, there is provided a stator assembly including: a stator core having a round base, a plurality of teeth radially formed along the outer circumferential surface of the base, and at least one connector bushing formed on the inner circumferential surface of the base; and an insulation coating layer formed on the surface of the stator core, wherein the insulation coating layer is coated to the outer diameter surfaces of the teeth of the stator core.

In order to enhance an insulating performance, the stator assembly further includes insulation films respectively inserted into slots formed between the teeth.

Moreover, the stator assembly further includes a hall sensor part having at least one hall IC portion, which is vertically formed and has a joining groove joined to the tooth, wherein the joining groove of the hall sensor part is joined to the tooth.

In another aspect, the present invention provides a manufacturing method of a stator assembly including the steps of: preparing a stator core having a round base, a plurality of teeth radially formed on the base, and slots formed between the teeth; forming an insulation coating layer on the surface of the stator core; selectively inserting insulation films into the slots of the stator core, on which an insulation coating layer is evenly formed on the entire surface of the stator core to the outer diameter surfaces of the teeth; and respectively joining base insulators to the top and bottom of the base.

In a further aspect, the present invention provides a stator assembly including: a stator core having a round base and a plurality of teeth radially formed along the outer circumferential surface of the base; an insulation coating layer formed on the surface of the stator core; and a pair of base insulators respectively joined to the top and bottom of the base, each of the base insulators having at least one connector bushing formed along the inner circumferential surface of the base insulator, wherein the insulation coating layer is coated to the outer diameter surfaces of the teeth of the stator core.

In this instance, the stator assembly may further include insulation films respectively inserted into slots formed between the teeth.

In a still further aspect, the present invention provides a stator assembly including: a stator core having a round base and a plurality of teeth radially formed along the inner circumferential surface of the base; an insulation coating layer formed on the surface of the stator core; and a pair of base insulators respectively joined to the top and bottom of the base, wherein the insulation coating layer is coated to the outer diameter surfaces of the teeth of the stator core.

In this instance, the stator assembly may further include insulation films respectively inserted into slots formed between the teeth.

The stator assembly according to the present invention can enhance the insulating performance by evenly forming the insulation coating layer on the outer diameter surfaces of the teeth of the stator, insulate the teeth without reducing the space of the slots, remarkably reduce the amount of resin moldings required, and freely decide the position of the hall sensor part.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Hereinafter, reference will be now made in detail to the preferred embodiment of the present invention with reference to the attached drawings.

Figure 1:
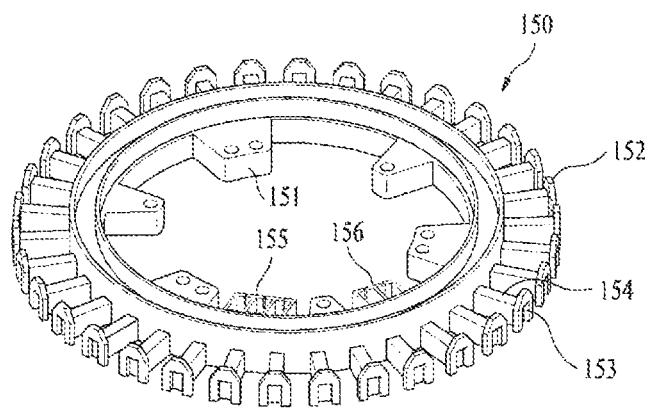
FIG. 1 is an exploded perspective view of a stator assembly of a motor according to a prior art.
Figure 1:
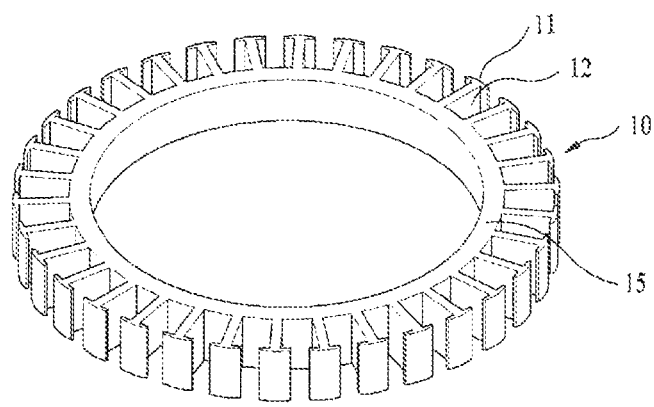
Figure 1:
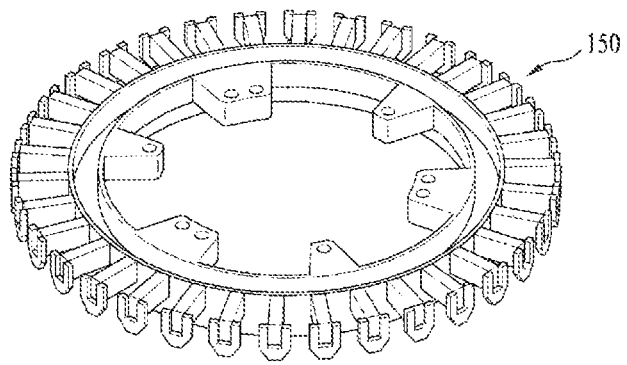
Figure 2:
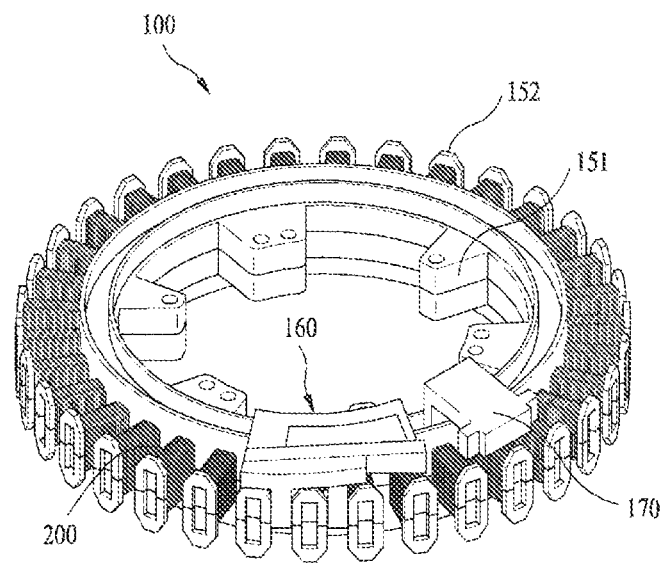
FIG. 2 is a perspective view of the stator assembly of the motor according to the prior art.
Figure 3:
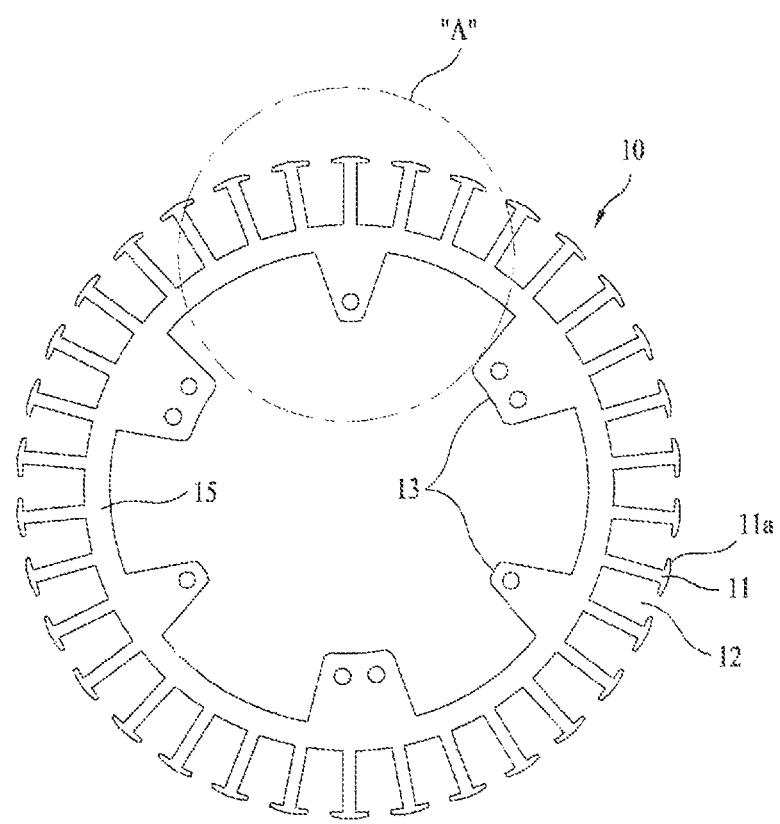
FIG. 3 is a plan view showing a stator core used in a stator assembly according to the present invention.

As shown in FIG. 3, a stator core 10 of a stator assembly according to the present invention is made by stacking thin steel sheets, and FIG. 3 is a plan view of the stator core 10 of the stator assembly viewed from the top. The stator core 10 includes a round base 15, a plurality of teeth 11 radially formed on the outer circumference of the base 15, and slots 12 formed between the adjacent teeth 11. Six connector bushings 13 for fixing and joining a stator are formed on the inner circumferential surface of the base 15. Of course, the number of the connector bushings is not restricted to the above. In this specification, an outer-rotor type stator assembly is illustrated and described, but the present invention is not restricted to the outer-rotor type stator assembly, and may be applied to the inner-rotor type stator assembly in the same way.

Preferable, in the case of the stator core 10, the base 15 and the teeth 11 are formed in such a fashion that an electric steel sheet is die-cut and stacked. According to the present invention, it is also possible that the stator core 11 is formed in such a fashion that an electric steel sheet is die-cut and wound in a spiral form, or that a split core consisting of steel sheets partially stacked in the split core type is joined. That is, it is enough that the stator core 10 in the present invention has the form illustrated in FIG. 3, and the stator core 10 is not restricted by manufacturing methods.

The connector bushing 13 of the stator core 10, which is a separate member from the base 15, may be joined by welding. Alternatively, the connector bushing 13 may be made in the split core type in such a fashion that the form of the connector bushing 13 is die-cut and stacked when the electric steel sheet is die-cut. Or, the connector bushing may be formed not on the inner face of the electric steel sheet but on the inner face of the base insulator 40 by plastic molding.

In order to insulate the stator core 10, an insulation coating layer 20 is formed on the entire surface of the stator core 10 including outer diameter surfaces 11a of the teeth. The insulation coating layer 20 is illustrated in FIG. 4.

Figure 4:
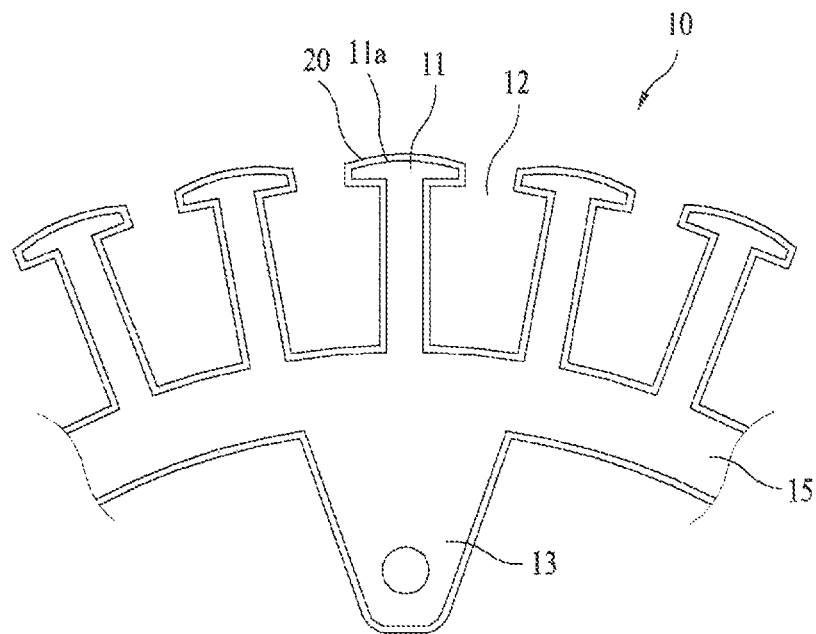
FIG. 4 is a conceptual view of the insulation coating layer of the stator core used in the stator assembly according to the present invention, and is a partially enlarged plan view of an "A" part of FIG. 3.

FIG. 4 is a conceptual view of the insulation coating layer of the stator core used in the stator assembly according to the present invention, and is a partially enlarged view of an "A" part of FIG. 3.

Referring to FIG. 4, the stator core 10 of the present invention has the insulated surface. The stator core 10 is insulated when a thin film is coated on the surface of the stator core 10. In the present invention, insulating materials or coating methods are not specially restricted, but it is preferable that insulating powder is coated on the surface of the stator core in an electrostatic manner. In the meantime, in FIG. 4, the connector bushing 13 is formed using the electric steel sheet. If the connector bushing is formed by plastic molding, the connector bushing 13 must be omitted in FIG. 4. Meanwhile, FIG. 4 illustrates the stator core used in the outer-rotor type motor, but the present invention is applicable to the inner-rotor type motor, in which the teeth 11 are formed on the inner face of the base 15 in such a way as to face the central portion of the stator core.

As shown in FIG. 4, the stator core 10 having the insulated surface has the insulation coating layer 20 evenly formed to the outer diameter surfaces 11a of the teeth. The insulation coating layer 20 can enhance the insulating performance of the stator core and solve the problem of withstand voltage caused from unevenness of the ends of the teeth. In the meantime, in order to enhance the insulating performance of the teeth 11 where the coil is wound, insulation films 30 may be selectively inserted into the slots 12 between the teeth if the occasion arises, and it will be described referring to FIG. 5.

Figure 5:
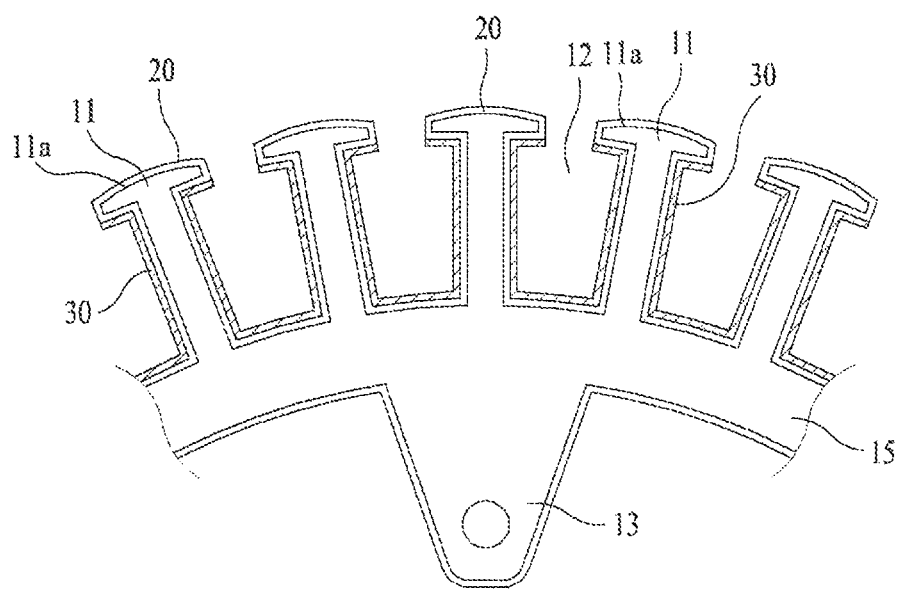
FIG. 5 is a schematically plan view showing a state where an insulation film is inserted into slots of the stator core used in the stator assembly of FIG. 4.

FIG. 5 is a partially enlarged view showing a state where the insulation films 30 are inserted into the slots of the stator core.

Referring to FIG. 5, the stator assembly according to the present invention has the insulation coating layer 20 formed to the outer diameter surfaces 11a of the teeth, and thin insulation films 30 are additionally inserted into the slots of the stator core 10 so as to enhance the insulating performance of the teeth 11. In other words, according to demands of electromagnetic characteristics, the insulation films 30 may be additionally inserted in the case that the insulating performance of the insulation coating layer 20 is insufficient.

As shown in FIG. 5, each of the insulation film 30 is bent and joined to the slot 12 of the stator core, so that the electric characteristics is not deteriorated even after the coil is wound. The insulation film 30 is an insulative resin film, and preferably, is made of flexible polymer resin. There are PET (Polyethylene Terephthalate), PC (Polycarbonate), and so on as the flexible polymer resin.

Figure 6:
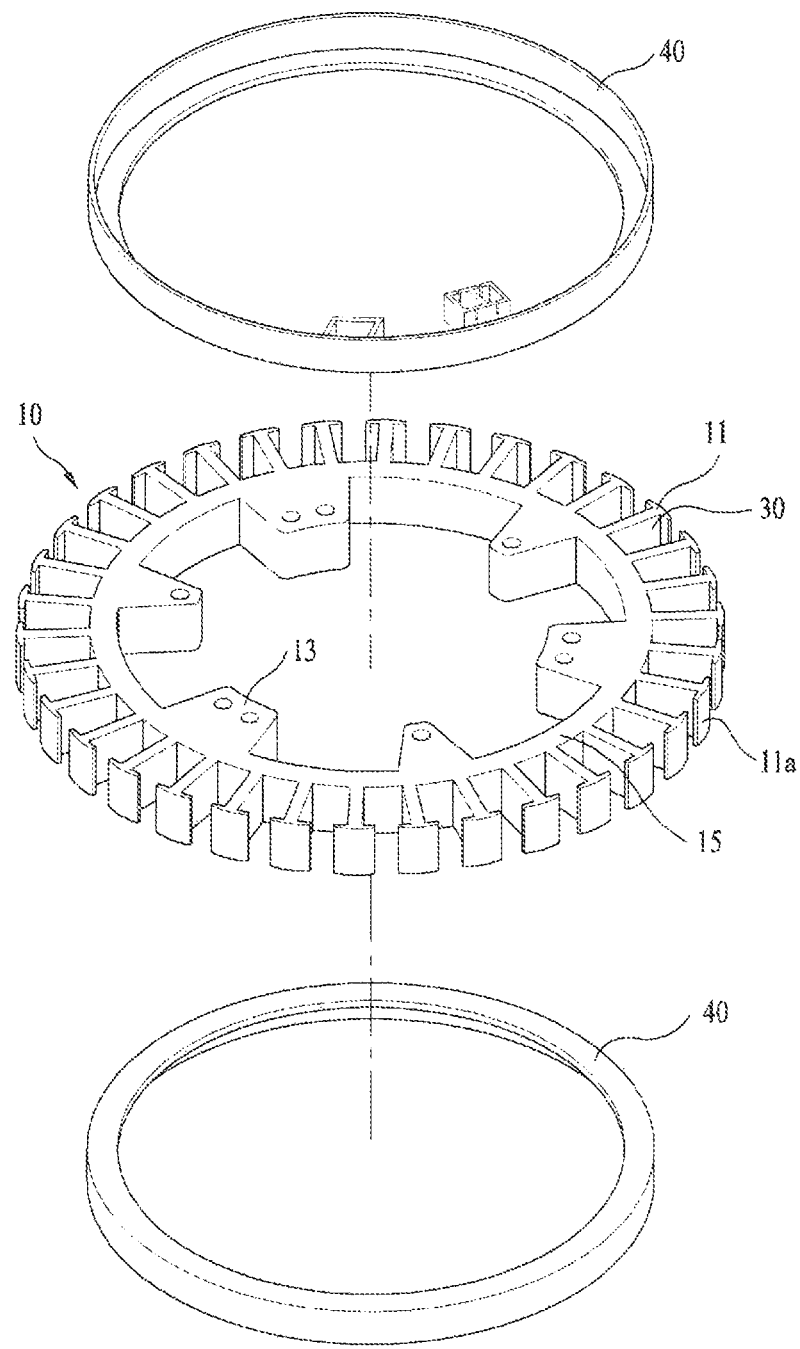
FIG. 6 is an exploded perspective view of the stator assembly according to the present invention.

FIG. 6 is an exploded perspective view of the stator assembly according to the present invention.

As shown in FIG. 6, the stator assembly according to the present invention has the structure that the base insulators 40 are respectively joined to the top and bottom of the stator core 10.

As described above, the stator core 10 includes: the insulation coating layer 20 formed on the entire surface of the stator core 10 including the outer diameter surfaces 11a of the teeth; and the insulation films 30 selectively inserted into the slots 11. Differently from the conventional stator assembly having the insulation structure that the teeth are respectively surrounded by the insulators, the stator assembly according to the present invention has the insulation structure using the insulation coating layer and the insulation films. Accordingly, in the present invention, the base insulators 40 do not insulate the teeth part. As shown in FIG. 6, the base insulators 40 are joined to the base 15 of the stator core 10. Meanwhile, in the drawings, the connector bushings 13 are formed on the inner face of the stator core, but may be formed on the inner face of the base insulators 40 by plastic resin molding.

Figure 7:
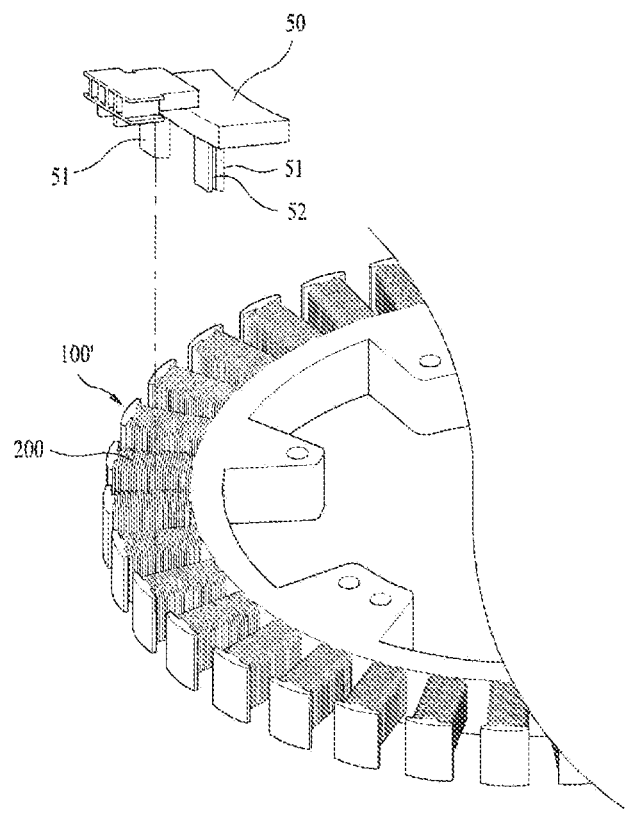
FIG. 7 is a partially perspective view showing a state where a hall sensor part of the stator assembly is joined.

FIG. 7 is a partially perspective view showing a state where a hall sensor part of the stator assembly is joined.

As shown in FIG. 7, the hall sensor part 50 according to the present invention has at least one hall IC therein. FIG. 7 illustrates the hall sensor part having two hall IC portions 51. The hall IC portion 51 is mounted vertically and has a joining groove 52 formed on a side thereof for allowing the hall IC portion 51 to be joined to the teeth 11. As described above, the hall sensor part 50 can be joined to the teeth, which are located at any position of the stator core, through the joining groove 52. Furthermore, in the structure that the hall IC portions are joined to the insulator like the prior arts, because a hall IC joining portion must be formed on the insulator, an amount of resin moldings required is increased. Accordingly, if the structure of the hall sensor part 50 according to the present invention is adopted, the amount of the required resin moldings can be reduced, and the hall sensor part 50 can be joined to the teeth, which are located at any position.

Figure 8:
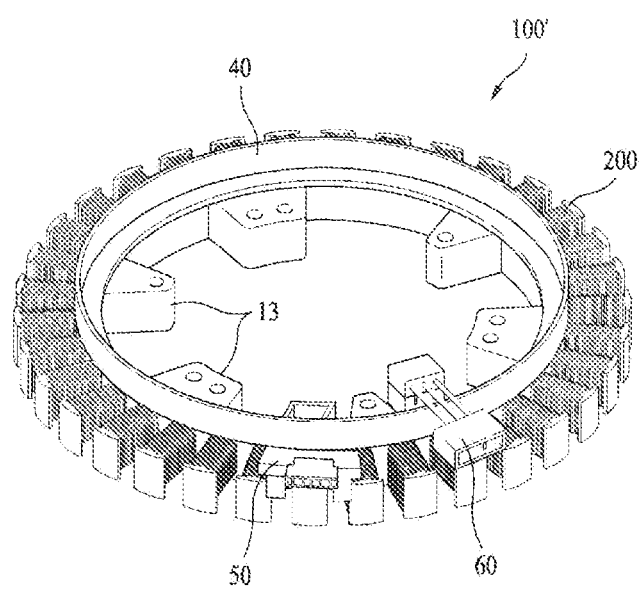
FIG. 8 is a perspective view of the stator assembly according to the present invention.

FIG. 8 is a perspective view of the stator assembly according to the present invention.

As shown in FIG. 8, in the state where the insulation films are inserted into the slots between the teeth of the stator core 10 having the connector bushings 13 formed on the inner face thereof and the insulation coating layer 20 formed on the surface of the stator core 10, the base insulators 40 are respectively joined to the top and the bottom of the stator core 10. For your reference, in FIG. 8, the connector bushing 13 is made of the same material as the electric steel sheet joined to the inner face of the stator core, but may be formed on the inner face of the base insulator by plastic resin molding. After that, a coil 200 is wound on each tooth, and then, the hall sensor part 50 is joined to the teeth. FIG. 8 illustrates a state where a power lead part 60 is joined to the stator assembly to connect the stator assembly to a power supply. In the meantime, FIG. 8 illustrates the stator assembly structure of the outer-rotor type motor but the present invention is applicable to the stator assembly structure of the inner-rotor type motor.

Figure 9:
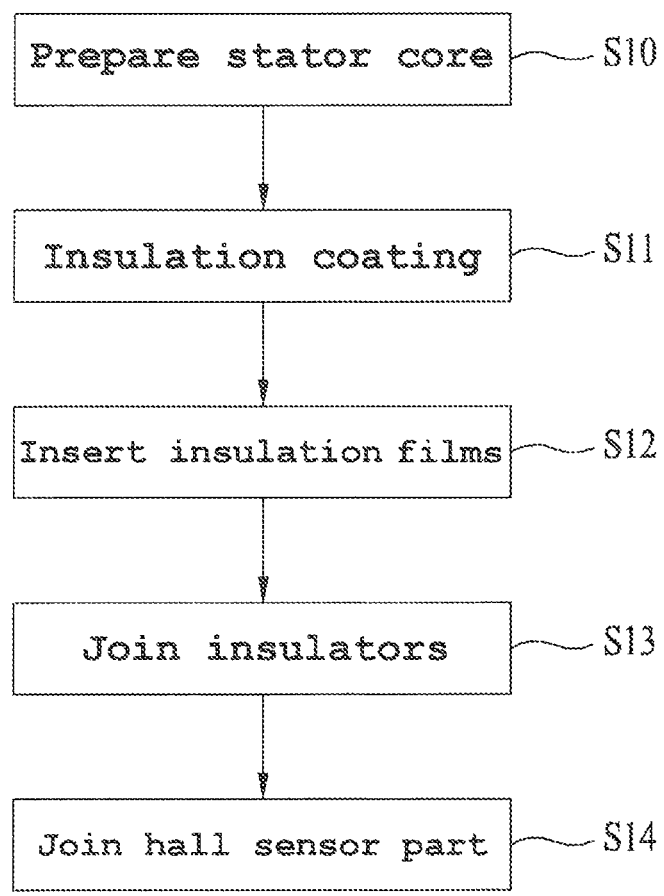
FIG. 9 is a flow chart showing a manufacturing method of the stator assembly according to the present invention.

FIG. 9 is a flow chart showing a manufacturing method of the stator assembly according to the present invention.

As shown in FIG. 9, in the first step (S10), the stator core 10 is prepared. The stator core 10 has a plurality of the connector bushings 13 formed on the inner face thereof. Alternatively, in the case that the connector bushings 13 are formed on the inner face of the base insulator, in the step (S13), the connector bushings are formed in the type of plastic molding.

In the next step (S11), the surface of the stator core 10 prepared in the step (S10) is insulation-coated to the outer diameter surfaces 11a of the teeth so as to form the insulation coating layer. In the next step (S12), which is selective, the insulation films 30 are inserted into the slots between the teeth 12 of the stator core, on which the insulation coating layer 20 is formed, as occasion demands. In the next step, the base insulators are joined to the base of the stator core. After that, the hall sensor part is joined in the state where the coil is wound (S14). Through the above steps, the stator assembly according to the present invention is manufactured.

While the present invention has been described with reference to the particular illustrative embodiment, it is not to be restricted by the embodiment but only by the appended claims. It is to be appreciated that those skilled in the art can change or modify the embodiment without departing from the scope and spirit of the present invention.

What is claimed is:

1. A stator assembly comprising:
a stator core having a round base, a plurality of teeth radially formed along the outer circumferential surface of the base, and at least one connector bushing formed on the inner circumferential surface of the base, wherein a tooth of the plurality of teeth has i) a first portion extended from the round base and ii) a second portion extended from an end of the first portion and having a) a first side facing the round base, b) a second side facing adjacent tooth, and c) a third side facing an outside of the stator core, wherein a coil is wound on the first portion between the round base and the second portion;
an insulation coating layer formed on the surface of the stator core, wherein the insulation coating layer is coated on the first portion and the second portion;
a hall sensor part having a hall IC portion vertically formed, wherein the hall IC portion is positioned between two adjacent second portions of the plurality of teeth and has a joining groove formed at a side of the hall IC portion; and
insulation films respectively inserted into slots formed between the teeth and having a bent end covering the second side,
wherein the first, second, and third sides at an end of the second portion of the tooth are inserted into the joining groove such that the hall sensor part is fixed on the tooth.

2. A stator assembly comprising:
a stator core having a round base and a plurality of teeth radially formed along the outer circumferential surface of the base, wherein a tooth of the plurality of teeth has i) a first portion extended from the round base and ii) a second portion extended from an end of the first portion and having a) a first side facing the round base, b) a second side facing adjacent tooth, and c) a third side facing an outside of the stator core, wherein a coil is wound on the first portion between the round base and the second portion;
an insulation coating layer formed on the surface of the stator core, wherein the insulation coating layer is coated on the first portion and the second portion;
a pair of base insulators respectively joined to the top and bottom of the base, each of the base insulators having at least one connector bushing formed along the inner circumferential surface of the base insulator;
a hall sensor part having a hall IC portion vertically formed, wherein the hall IC portion is positioned between two adjacent second portions of the plurality of teeth and has a joining groove formed at a side of the hall IC portion; and
insulation films respectively inserted into slots formed between the teeth and having a bent end covering the second side,
wherein the first, second, and third sides at an end of the second portion of the tooth are inserted into the joining groove such that the hall sensor part is fixed on the tooth.

* * * * *